US009447983B2

(12) United States Patent
Smith et al.

(10) Patent No.: US 9,447,983 B2
(45) Date of Patent: Sep. 20, 2016

(54) BUILDING ENERGY ANALYSIS AND MANAGEMENT SYSTEM

(71) Applicant: FlowEnergy, L.L.C., Woodinville, WA (US)

(72) Inventors: Arthur Neal Smith, Redmond, WA (US); Joshua Jerome Doerr, Seattle, WA (US); Christopher Tillman Reed, Seattle, WA (US); Jeffrey Michael Creighton, Seattle, WA (US); Christopher John Robson, Renton, WA (US); Andrew James Horn, Mukilteo, WA (US); David Anthony Rogers, Sebastopol, CA (US); Larry Ray Willis, Jr., Milton, GA (US); Billy Joe Melin, Sr., Whitney, TX (US); Tamara Jewell Hansen, Medina, WA (US)

(73) Assignee: FlowEnergy, L.L.C., Woodinville, WA (US)

( * ) Notice: Subject to any disclaimer, the term of this patent is extended or adjusted under 35 U.S.C. 154(b) by 362 days.

(21) Appl. No.: 14/031,009

(22) Filed: Sep. 18, 2013

(65) Prior Publication Data
US 2015/0057810 A1 Feb. 26, 2015

Related U.S. Application Data

(60) Provisional application No. 61/868,028, filed on Aug. 20, 2013.

(51) Int. Cl.
*G06F 19/00* (2011.01)
*F24F 11/00* (2006.01)

(52) U.S. Cl.
CPC ...... *F24F 11/001* (2013.01); *F24F 2011/0075* (2013.01)

(58) Field of Classification Search
CPC ............ G01F 15/005; G01F 25/0007; G05D 7/0635
See application file for complete search history.

(56) References Cited

U.S. PATENT DOCUMENTS

| | | | |
|---|---|---|---|
| 2007/0012367 A1* | 1/2007 | Hotz | F16K 5/0647 137/556.3 |
| 2007/0023086 A1* | 2/2007 | Carlson | G05D 16/0655 137/495 |
| 2008/0077335 A1* | 3/2008 | Lee | G01F 1/363 702/47 |
| 2008/0243291 A1* | 10/2008 | Lee | G05B 23/024 700/110 |
| 2012/0022700 A1* | 1/2012 | Drees | G05B 15/02 700/276 |

(Continued)

FOREIGN PATENT DOCUMENTS

JP 2008065812 A * 3/2008

*Primary Examiner* — Michael D Masinick
(74) *Attorney, Agent, or Firm* — Perkins Coie LLP (57) ABSTRACT

This application relates to a building energy analysis and management system for measurement and verification of building performance. The system can analyze, optimize, manage, maintain, trouble shoot, and/or modify building systems, such as HVAC systems, in connection with the building energy usage. Measurements may be gathered for one or more HVAC units coupled to pressure independent valves, and sent to one or more Surge Panels that pass data to remote analysis servers, which can receive other system or external data. The analysis servers compare measurements to predicted values and can standardize the predicted values to account for external conditions. The comparison can result in difference values used to generate probable causes and optimization recommendations. The system outputs reports or other data display using a graphical user interface that can be adjusted for an anticipated user.

19 Claims, 5 Drawing Sheets

(56) References Cited

U.S. PATENT DOCUMENTS

| | | | | |
|---|---|---|---|---|
| 2013/0240045 A1* | 9/2013 | Feng | ................. | G01F 1/56 137/10 |
| 2015/0277447 A1* | 10/2015 | Schmidt | ................. | G05D 7/0635 137/10 |
| 2015/0308579 A1* | 10/2015 | Hagmann | ................. | F16K 15/02 137/528 |

* cited by examiner

BUILDING ENERGY ANALYSIS AND MANAGEMENT SYSTEM

CROSS REFERENCE TO RELATED APPLICATION

This application claims the benefit of and priority to U.S. Provisional Patent Application No. 61/868,028, titled Building Energy Analysis and Management System, filed Aug. 20, 2013, and which is incorporated herein in its entirety by reference thereto.

TECHNICAL FIELD

The present disclosure is related to building environment control systems and building energy analysis and management systems.

BACKGROUND

A primary concern for building professionals such as executives, managers, and operators, is implementing systems for building energy consumption control and monitoring. While heating, ventilation, and air conditioning (HVAC) hardware and related energy consumption comprise a significant portion of building operating expenses, building professionals have no affordable yet reliable way to accurately determine whether these costs are justified. Building executives, for example, are constantly faced with the decision of whether to upgrade to the latest hardware. Vendors of these systems may make grandiose promises regarding improved performance but, without a reliable means of determining current inefficiencies or verifying results, these statements often lack adequate context and cannot be accurately verified. Verification of such promises and actual building performance would be considerably simplified by having independently gathered specific data regarding current inefficiencies, as well as tracking data and performance improvement data. Furthermore, a system to more closely monitor HVAC unit performance, quickly identify problems, and suggest solutions would help building managers and operators meet their long and short term goals, as well as help control their budgets.

While there are environment control systems aimed at maximizing performance and minimizing energy consumption, many current HVAC systems lack the capability to precisely measure critical variables for analysis. Constantly changing factors, both within building systems and external to them make determining base line comparisons exceedingly difficult. Added to this difficulty is the fact that most HVAC systems do not have the granular control needed to implement improvements, even when inefficiencies are identified. Due to these constraints, the possibilities for accurate and affordable HVAC monitoring and control procedures remain largely unexplored.

DETAILED DESCRIPTION

Technology is disclosed for HVAC system analysis and control ("the technology"). In some embodiments, this comprises measuring operation data for HVAC units, such as BTUs per gallon and BTUs per square foot, and verifying actual and expected performance. These measurements, in accordance with at least one embodiment, are based on a flow rate through a pressure independent valve. Examples of pressure independent valve systems are disclosed in U.S. Pat. No. 7,128,086 and U.S. Patent Application Publication No. 2012-0185102, both incorporated herein by reference.

In some embodiments, the measure and verify process can include measurements regarding one or more HVAC systems are gathered on a unit by unit basis. These measurements may be sent to one or more central data processors. Applicant has utilized the phrase "Surge Panel" in connection with a device configured to interact with one or more HVAC units to perform operations such as data gathering and dispersal, pre-rocessing, and HVAC unit control. For purposes of simplicity, the following disclosure will use the term "Surge Panel" in connection with this component of the disclosed technology. Preprocessing of the measurement data may be applied at one or more Surge Panels. Pre-processed data may then be sent through a network to an analysis server for, inter alia, verification. The analysis server may also receive other system or external data, such as weather conditions and geographic data. The analysis server may compare the measurements to predicted values. The predicted values may be calculated using one of several metrics, such as historical readings, similar and/or reference units, and calculated values; these predicted values may be related to an expected operation of the pressure independent valve. The analysis server may also adjust the predicted values to account for external conditions, such as weather, unit age, season, etc. The comparison by the analysis server may result in one or more difference values.

The analysis server may also generate inferences based on the difference values. Inferences may be based on one or more known reactions of a HVAC system (having one or more pressure independent valves) to a number of stimuli, such as previously observed reactions of HVAC systems with pressure independent valves to one or more of the stimuli. For example, the analysis server may have access to a mapping of possible difference values for the connected type of HVAC system to probable causes for the difference. Furthermore, the analysis server may also generate possible optimizations for one or more HVAC systems. The possible optimizations may be based on the measured values, the difference values, or the probable causes, and may be integrated into controlling the pressure independent valve, for example by suggesting a flow rate or valve stem position adjustment. For example, the analysis server may determine that the system would be 13% more efficient if the flow rate were increased by 4%, and may generate an optimization as a report to this effect. As another example, the analysis server may determine, based on a probable cause that a component is only working intermittently, that one possible optimization may be to replace the component. Optimizations may be restricted to particular operating parameters and may be focused on minimizing power consumption, maximizing equipment life, reducing unnecessary component expenditures, etc. Optimizations may be generated in various categories such as repair and maintenance, hardware upgrades, process changes, and building professional training.

Based on the difference values, the probable causes, and the optimizations, the analysis server may generate a number of results including, for example, difference from prediction measurements, causes, optimization suggestions, difference from goals, and control signals. These results may be taken directly from the difference values, probable causes, and optimizations, or they may be generated from a combination of these values. The results may be modified in numerous ways, such as being standardized across building types, translated for interaction with particular automated control systems, converted into text used for alerts, or matched to predetermined results. The results may be formatted for different users or purposes using other external data, such as the report template, HVAC interface control functions, web content slots, or storage algorithms. The output may be transferred to storage devices, local or remote, communicated to building professionals, or sent to third parties. The output can be presented to a user via one or more graphical user interfaces and in a selected format that may be variable depending upon the target audience, such as a building owner, building executive, a building engineer or maintenance technician.

It is to be understood that the logic illustrated in each of the following block diagrams and flow diagrams may be altered in a variety of ways. For example, the order of the logic may be rearranged, sub-steps may be performed in parallel, illustrated logic may be omitted, other logic may be included, etc.

Figure 1:
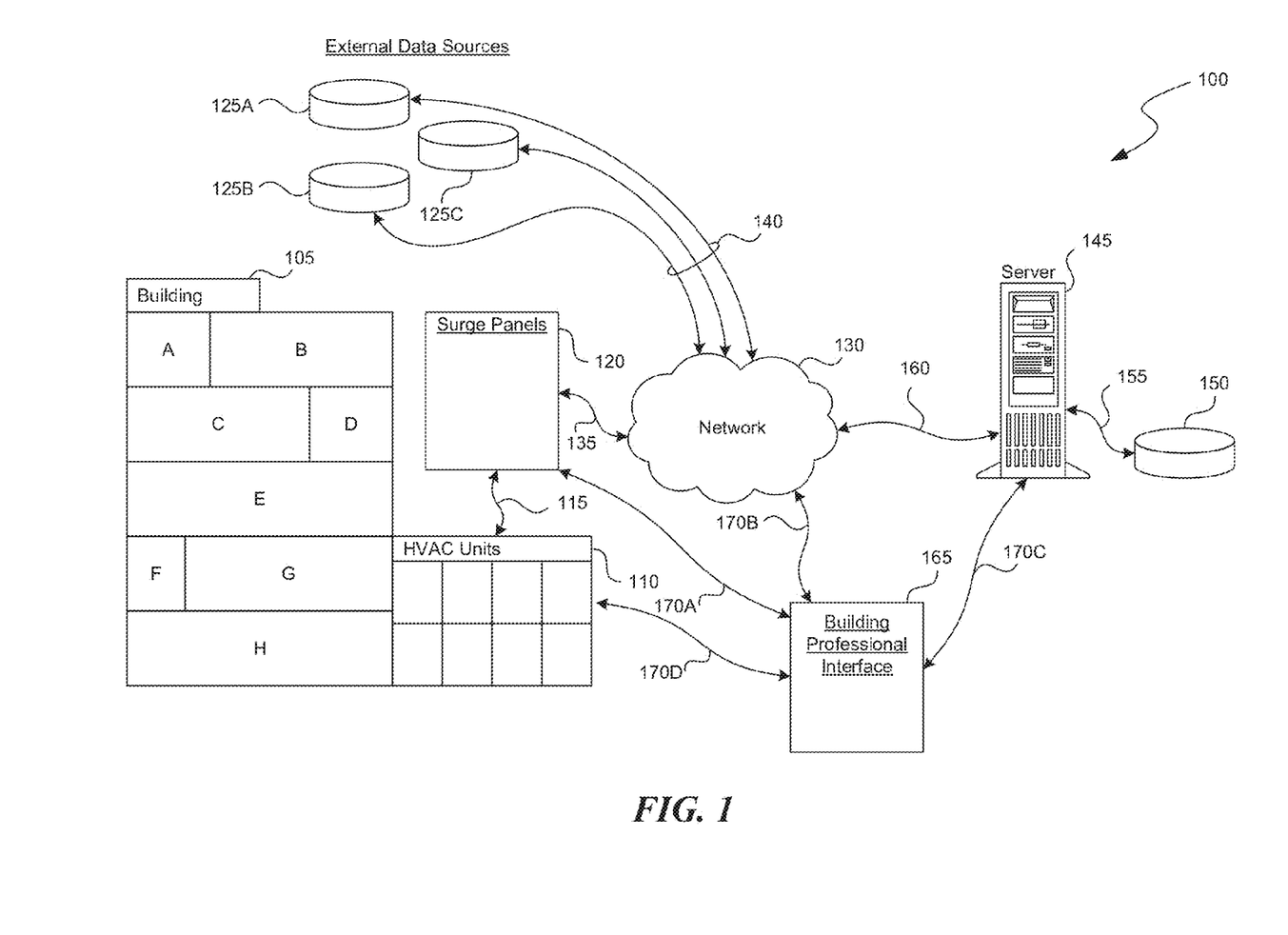
FIG. 1 is a block diagram illustrating an overview of an environment and devices on which some embodiments of the current application may operate in accordance with at least one embodiment of the present disclosure.

FIG. 1 is a block diagram illustrating an overview of an environment and devices on which some embodiments of the current application may operate. A system for implementing the technology may involve one or more buildings 105 with associated HVAC units 110, connected to Surge Panels 120, external data sources 125, building professionals 165, analysis server 145, and local storage 150.

Buildings, such as building 105, may have various areas, shown here as A-H. Each area may be associated with one or more HVAC systems having one or more HVAC units 110a-h. HVAC units 110a-h may be connected to Surge Panels 120 via a data link 115. HVAC units 110a-h may each supply heating, ventilation and air-conditioning services to one or more associated areas A-H. HVAC units 110 may each have a fluid-based heating or cooling system, connected to a valve member, such as a pressure independent valve member manufactured by Flow Control Industries, Inc., of Woodinville, Wash. The HVAC units 110 may be equipped with numerous sensors. For example the sensors may include supply and return fluid temperature sensors, pressure sensors, valve rotation and position sensors, flow rate sensors, coil temperature sensors, air temperature sensors, occupancy sensors or power meters.

HVAC units 110 may be connected to one or more Surge Panels 120 via data link 115. As used herein, data links may be any wired communication, such as CAT, coaxial, optical, or any other data bus or may be any wireless communication such as infrared, radio, microwave, sonic, or electromagnetic induction. Furthermore, data links may use any number of communication protocols, encrypted or unencrypted, such as TCP, IP, FTP, or POP. Each HVAC unit 110 may have its own Surge Panel 120, or each Surge Panel 120 may accommodate multiple HVAC units 110.

Data gathered at Surge Panels 120 from the sensors may be pre-processed. For example, change in temperature and flow rate may be used in the following formula to generate BTUs: $500*GPM*\Delta Temp=BTUHs$. Surge Panels 120 may also collect other measurements from building 105, such as temperature readings. Furthermore, Surge Panels 120 may interface with other systems in building 105 to gather additional data, to provide automated control signals, or to provide an interface to building professionals. Surge Panels 120 connect to network 130 via data link 135.

Network 130 can be a local area network (LAN) or a wide area network (WAN), but may also be other wired or wireless networks. Network 130, for example, may be a combination of the Internet, private networks, and virtual private networks.

External data sources 125 may also connect to network 130 through data links 140. External data sources may provide any data relevant to the building's operational environment or HVAC operations, such as weather conditions, time, historical usage patterns, building data, geographic data, utility meter data, external airflow, etc. For example, weather service 125A may provide current temperature and humidity conditions of the building's ambient environment, measurement log 125B may provide historical readings for building 105, and utility service 125C may provide utility usage. External data sources A-C are only some examples, but external data sources 125 may include other data sources related to the building.

Building professional interface 165 represents various components by which building professionals may enter, retrieve data and/or view from the system. Building professional interface 165 may be a computing device networked via data link 170B to network 130, may be an interface directly coupled to server 145 via data link 170C, may be an input component for Surge Panels 120 via data link 170A, or may represent control components 170D for HVAC units. As a first example, a building manager may use building professional interface 165 to access one or more Surge Panels 120 to specify HVAC operating conditions or may submit data to server 145 through a web interface. As a second example, a building executive may use building professional interface 165 to view a report generated by server 145. As a third example, the building operator may receive, using building professional interface 165, an optimization recommendation from server 145 displayed in a website, and connect to HVAC units 110 via control components 170D to implement the optimization.

Computing devices recited herein, such as server 145 and database 150, may include one or more processing units, a system memory, a storage unit, a network interface or adapter, a display, or an input device. These computing devices may include a variety of computer-readable storage media or memory. The term "memory" is used to encompass both "primary memory" and "secondary memory." Primary memory is used to hold programs when they execute and is typically volatile such as RAM, FLASH, or various types of cache memory. Secondary memory is used to hold programs between executions such as a magnetic storage device, optical storage device, flash drive, ROM, tape drive, disk, CD, DVD, Blu-ray, or a network device configured to convey a data structure. Computer-readable media can be any available storage media and include both volatile and nonvolatile media and removable and non-removable media. Computing devices may operate in a networked environment using logical connections to one or more remote computing devices, such as through network 130.

Server 145 may be a dedicated server, a personal computer, mobile device, embedded device, or any other computing device or set of computing devices, such as a "cloud based" system of servers, capable of serving data to a client computing device. In some embodiments, a device may act as both a client and server computing device.

The technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

Measurements from building 105 and HVAC units 110, preprocessed data from one or more Surge Panels 120, external data from one or more external data sources 125, and input from one or more building professionals from building professional interface 165, collectively referred to as received data, may be received at server 145 through network 130 and data link 160. Server 145 may also obtain data such as results of previous analytics, previously entered building and unit specifics, operating condition modifiers, expected performance levels, engineering modeling, component performance curves, or building models from locally connected database 150. As discussed further in relation to FIGS. 2 and 3, server 145 may apply analytics to the received data and obtained data to generate predicted measurements, compare predicted measurements to measurements from building 105 and HVAC units 110 to determine difference values. In some embodiments, server 145 may generate inferences based on the difference values. In some embodiments, server 145 may generate optimizations which may be based on the difference values, and in embodiments that generate inferences, may also be based on associated probable causes related to the actual verified HVAC performance, or lack of performance.

The difference values and probable causes may be transformed in a number of ways, such as being standardized to account for different building types and uses, geographic areas, weather conditions, and HVAC component configurations. For example, a building may be classified as a hospital, the building may be in Dallas, Tex., and the current date may be October 23. The server 145 may standardize the difference values to account for these characteristics, for example by using statistical regression techniques, so the difference value may be compared with difference values from an HVAC system in a stadium in Chicago, on July 15.

The difference values and probable causes, whether standardized or not, may be stored in local database 150, sent to building professionals through interface 165, or sent to external data sources 125. For example, difference values may be transferred to an aggregate data storage connected to multiple building analytics systems.

Optimizations may be converted into optimization suggestions such as textual suggestions for equipment upgrades and replacements, operation parameters, training, or building adjustments. For example, the system may receive, from a Surge Panel 120, an actual reading for an HVAC unit of 80 BTUs per gallon. Based on a building model developed and/or used by the system, the analytics may have predicted a reading of 120 BTUs per gallon. The analytics may further contain a table with a mapping for this type of system. The mapping may link a difference value of 40 BTUs per gallon to, as an example, a malfunctioning ventilation air damper for the HVAC unit or one or more other causes of poor performance. The system may determine that an optimization solution may be, as an example, to turn off the space heater in a designated area in the building. The system may generate a textual version of this optimization stating, "It is likely a space heater is operating in area G. HVAC performance will be improved if the space heater is turned off."

Optimizations may also be converted into control signals. Control signals may be routed through network 130 and a Surge Panel 120 to control automatic operation of particular HVAC units. For example, the system may receive, from a Surge Panel 120, a reading for an HVAC unit of 268 BTUs per gallon. Based on readings from units operating under similar conditions, the analytics may have predicted a reading of 179 BTUs per gallon. The analytics may further contain a table with a mapping for this type of system. The mapping may link a ratio difference value of approximately 3/2 to a probable cause of a cyclic loop of over-heating and over-cooling a coil. The system may determine an optimization would be to set the flow to 30% for five minutes to allow the cycle to level out before allowing further flow adjustments. The system may determine a particular control signal indicating that the pressure independent valve should be set to 30% and that other control signals should be ignored for the next five minutes.

Several embodiments of the technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are storage computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media and computer-readable transmission media.

Figure 2:
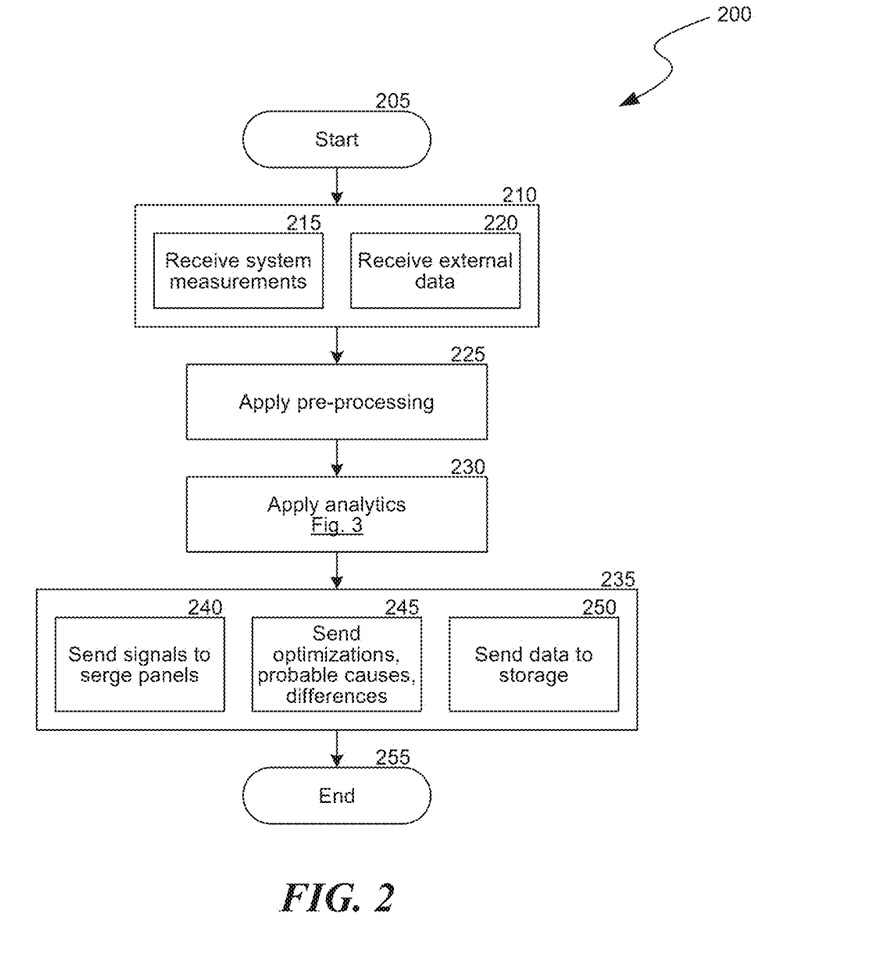
FIG. 2 is a flow diagram illustrating at least one embodiment of a routine for applying analytics to HVAC systems.

FIG. 2 is a flow diagram illustrating at least one embodiment of a routine 200 for applying analytics to HVAC systems. Beginning from step 205, the process continues to step 210, comprising steps 215 and 220. At step 215 the process receives system measurements. System measurements may comprise readings from HVAC sensors, such as temperature, pressure, valve rotation/position, and flow rate sensors. System measurements may also comprise measurements from other components (e.g., coil temperature), readings from third-party systems, fan readings (e.g., amp draw), exhaust air temperature, and return air temperature. System measurements may also comprise manually entered data from a user (e.g., a building operator), such as building square footage or pre-processed data (e.g., BTUs calculated from other system measurements.

At step 220 the process receives external data. External data may come from a variety of sources such as weather services, building professionals, historical measurement databases, and utility services. External data may be any data external to building measurements useful for creating models, predicting measurements, adjusting for conditions, generating inferences, determining optimizations, determining goals, or appropriately formatting output. For example, external data may include current weather conditions, outside airflow, annual energy consumption, and geographic data. External data may also include operating condition modifiers for energy use. For example, in a system monitoring a theater, one source of external data may be ticket sales. Ticket sales may be correlated to an expected number of occupants, which may be used to more accurately predict expected air temperature measurements. External data may also include goal data, such as an HVAC component vendor's promised performance, budget goals or operating parameter goals. The process then continues to step 225.

At step 225, the process may apply pre-processing. For example, measurements may be adjusted to account for external data, measurements and/or external data may be combined using pre-determined formulas to calculate additional HVAC conditions, appropriate time frames for historical measurements may be determined, or similar units or buildings may be selected. The process then continues to step 230.

At step 230 the process applies analytics to compare predicted values with adjusted or unadjusted measurements to produce at least one effect, such as difference values, causes, optimizations, and control signals. Applying analytics is discussed in more detail in relation to FIGS. 3 and 4. The process then continues to step 235.

Step 235 comprises steps 240, 245, and 250. At step 240, if the analytics resulted in control signals to automatically controlled HVAC units, the control signals are sent to one or more of the building's Surge Panels. At step 245 if the analytics determined optimizations, causes, or difference values, these may be sent to various internal or third party entities. For example, any of these determined outputs may be included in reports to building professionals or sent to third parties, such as analytics providers to monitor system performance and improve future predictions. At step 250 the process may send any of the determined outputs to storage. The process then continues to step 255 where it ends.

Figure 3:
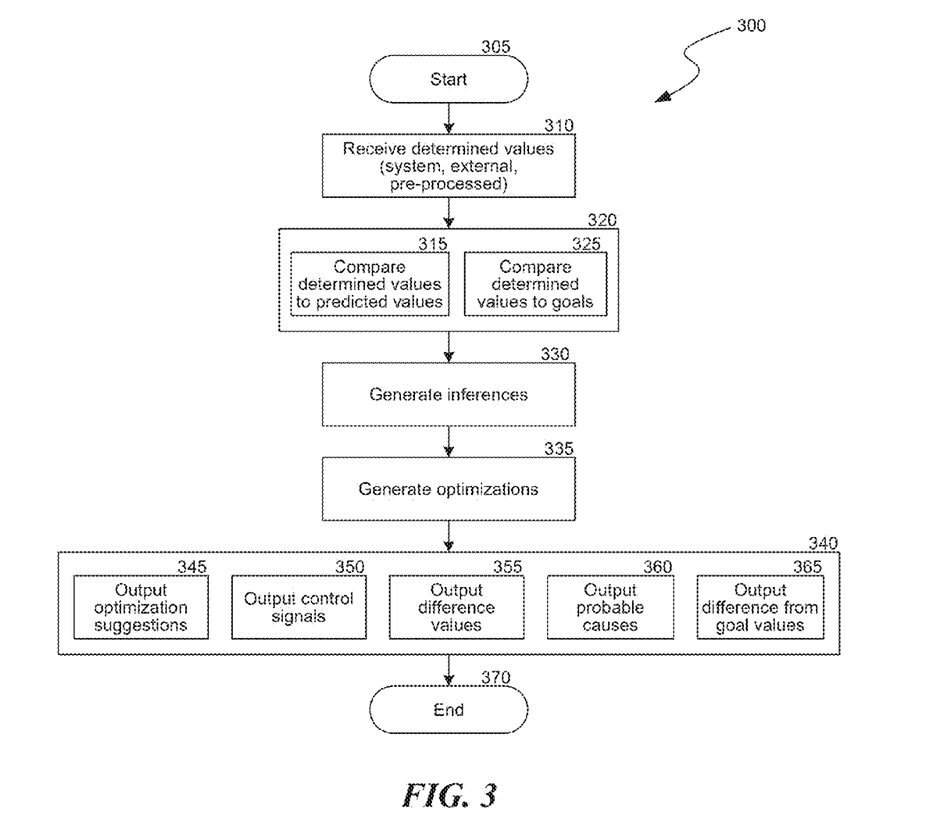
FIG. 3 is a flow diagram illustrating a more detailed representation of a process to compare predicted and determined values.

FIG. 3 is a flow diagram illustrating a more detailed representation of a process 300 to compare predicted and determined values. The process begins at step 305 (i.e., "start") and continues to step 310. At step 310 the process receives HVAC determined values. HVAC determined values, or "determined values," may comprise received system measurements, discussed above in relation to step 215, received external data, discussed above in relation to step 220, or pre-processed values, discussed above in relation to step 225. The process then continues to step 320 comprising step 315 and 325.

At step 315 the process compares one or more determined values to predicted values. The predicted values may be previously determined or may be calculated at step 315. In some embodiments, predicted values may be based on a comparison with historical measurements such as measurements from a previous timeframe (i.e. the previous day, week, month, year) or may be based on a comparison of historical measurements from a similar time frame such as the same time last year. In some embodiments, predicted values may be based on the comparison with similar units or buildings either at the same time or with historical measurements for those buildings. In some embodiments, predicted values may be calculated using physics-based models. Physics-based models may be configured with building specifics, HVAC specifics, and equipment performance curves. Models may be of the building hydraulics, energy usage, thermodynamics of coil performance, etc. Predicted values may be modified with external data comprising operating condition modifiers such as weather, time, location, system type, building characteristics, unit age, building professional entered parameters, airflow, etc. In some embodiments, operating condition modifiers may be incorporated into physics-based models to more accurately predict expected measurements. Predicted measurements may be in various units such as BTUs, BTUs per gallon, BTUs per square foot, kilowatts, gallons per minute or temperature. The process then continues to step 325.

In some embodiments the process is configured to track goals. At step 325 the process may determine difference from goal values. Goals may be specified by a building professional to track budgets or performance, or may be specified by a third-party such as a vendor of HVAC products. For example, a vendor of double pane windows may make a promise to a building owner that installing their windows will save 15% on the building's energy bills. A goal may then be 15% below the measurements taken at the same time in the previous year, 15% below measurements predicted by models configured without double pane windows, 15% below measurements from similar buildings without double pane windows, etc. The process then continues to step 330.

In step 330 the process generates one or more inferences. Inferences are links between probable causes and measurements or difference values. Inferences may be based on previously observed difference values and known corresponding causes. For example, it may have been determined that a difference value of 20 BTUs per square foot is attributable to a malfunctioning fan. As another example, the process may receive a reading of 20 BTUH/ft$^2$ when the predicted value is 15 BTUH/ft$^2$. A mapping may link the difference value of 5 BTUH/ft$^2$ to a most likely cause of a personal space heater being used in the portion of the building regulated by the HVAC unit. In some embodiments, the process may have access to one or more tables matching difference values compromising BTUs/ft$^2$ or BTUs/gallon to probable causes. The process then continues to step 335.

At step 335 the process generates optimizations. Optimizations are actions that may be taken in relation to a system, whether performed automatically or by a building professional, to improve performance in one or more categories such as minimizing power consumption, maximizing unit life, or improving system capacity. Optimizations may comprise suggestions such as fixing a cause determined in step 330, selecting an operating mode to improve performance, performing a cost benefit analysis of possible changes, determining variations on component synergy (i.e. activation sequences, connection procedures, or operating parameters), building operator training, component upgrades or downgrades, etc. For example, a building professional may have specified a preference for decreasing HVAC power consumption. Operating parameters for the system may specify a desired temperature of 63° with a tolerance of plus or minus 2°. The process may receive a set of measurements that indicates the current settings require the building's HVAC units to cool the incoming air to below 57° for approximately five hours each day. The process may rely on the fact that the power required cool air to below 57° is significantly greater than the power required to cool air to above 57°. The process may determine that an optimization would be to change the desired temperature to 65° with a tolerance of plus or minus 3°, which would reduce the time that the building's HVAC units would have to cool the incoming air to below 57° to only three hours per day. The process then continues to step 340.

Step 340 comprises blocks 345, 350, 355, 360, and 365. At step 345 the process outputs optimization suggestions. Optimization suggestions are based on the optimizations generated in step 335. Optimization suggestions may be text, alert signals, images, web links, audible signals, visual signals, etc. Optimization suggestions may be included in reports for building professionals, sent as alerts, stored in a log, included as part of a web application, or included in other output formats. At step 350, in some embodiments, the process generates control signals to automatically implement optimizations. This may be accomplished by reducing the optimizations from step 335 into a series of operations, and generating signals corresponding to HVAC interface control functions configured to perform the series of operations. At step 355 the process may output difference values determined in step 315. As discussed above, these may be sent as a part of reports, saved as raw data to be included in other metrics such as web presentations, or stored in local or third-party databases for further analysis. At step 360, the process may output the probable causes determined in step 330. Similar to difference values, probable causes may be sent as a part of reports, saved as raw data to be included in other metrics such as web presentations, or stored in local or third-party databases for further analysis. At step 365 the process outputs determined difference from goal values determined in step 325. Difference from goal values may be paired with one or more causes for the difference, and may include suggestions for meeting the goal or indications of the source of the goal such as a promise by a particular vendor. The process then continues to step 370, where it ends.

Figure 4:
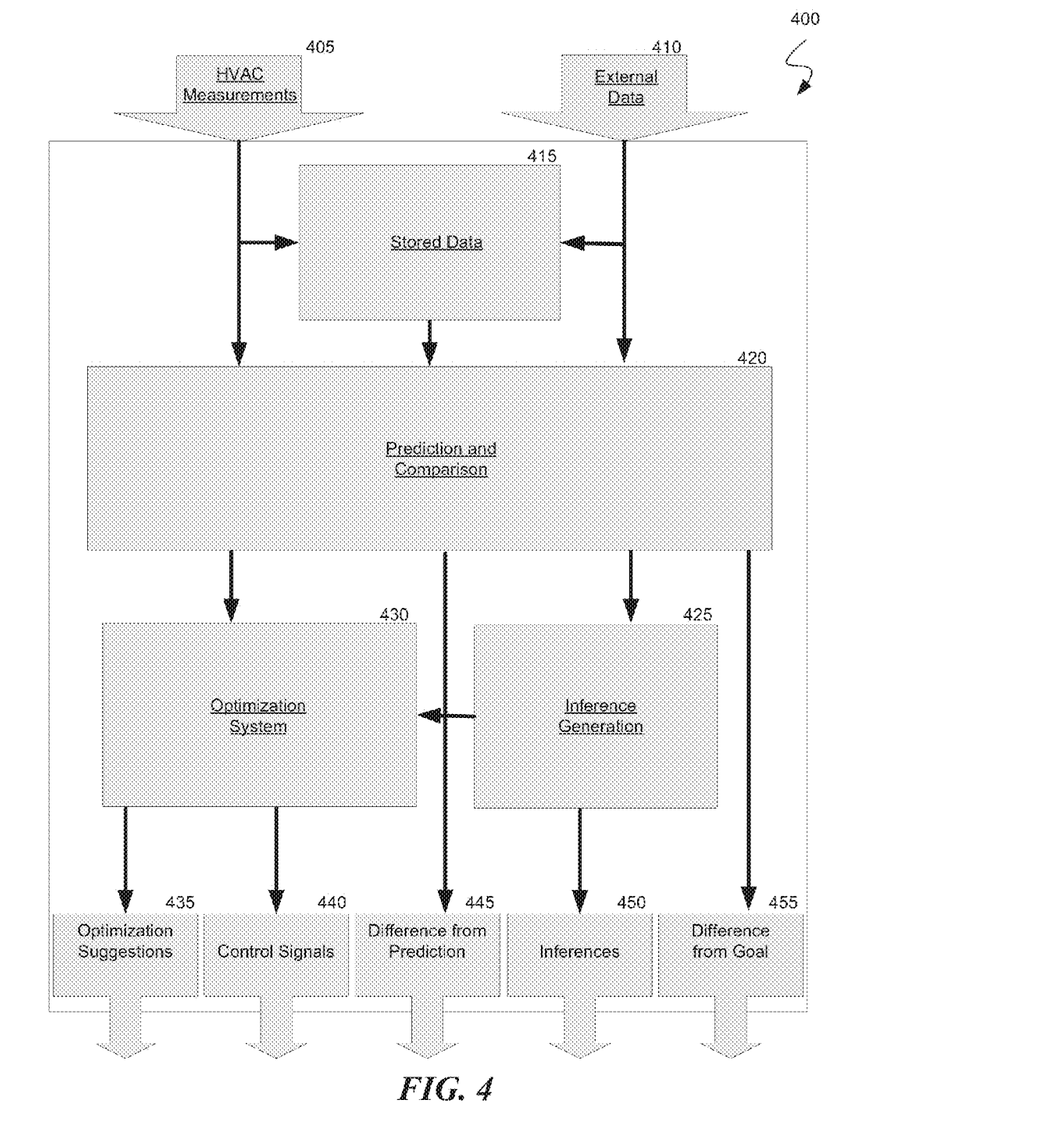
FIG. 4 is a block diagram illustrating components configured to apply HVAC analytics.

FIG. 4 is a block diagram illustrating component 400 configured to apply HVAC analytics. Block 405 is an input interface configured to receive HVAC measurements such as the measurements discussed above in relation to block 215. Block 410 is an input interface configured to receive external data such as the data discussed above in relation to block 220. Blocks 405 and 410 pass the received data to block 420. In some embodiments blocks 405 and 410 also pass the received data to block 415 to be stored for later use.

Block 415 represents local data stored by the system. This data may be previously received HVAC measurements or external data, or may be configuration data for generating predictions. For example, configuration data may be building models or parameters for a building model, measurement modifiers for various conditions such as weather, time, location, system type, building characteristics, unit age, building professional's entered parameters, and airflow. This data may also be pre-processed data to combine various HVAC measurements and/or external data to calculate operating conditions such as BTUs/gallon or BTUs/ft$^2$. Block 415 passes stored data to block 420.

While FIG. 4 shows blocks 405, 410, and 415 only passing values to block 420, in some embodiments these values may also be used by other blocks. For example, inference mappings may be adjusted to account for current conditions received as external data, optimizations may receive a current initialization sequence that can be modified, and difference from goals output may be customized to show stored contract parameters and may include suggestions or optimizations determined to meet the identified goals.

Block 420 receives HVAC measurements, external data, and stored data, and uses it to make comparisons with predicted values and goal values. Predicted values may be created in block 420 in response to received HVAC measurements, or may have been previously determined and stored based on previously configured building models, previously received historical measurements, or previously received similar building measurements. The system at block 420 may also compare the measured and pre-processed data to goals to determine differences from stated goals. As discussed above, these may be goals based on vendor promises or may be set by building professionals or may be specified by other entities. Both types of difference values may take a variety of forms from simple comparisons, such as subtraction, value pairs, or ratios, to more complex comparisons such as regression statistics, graphical charts, and averages. The difference values are passed to blocks 430 and 445. The difference from goals values are passed to block 455.

At block 425 the system generates inferences based on the determined difference values. As discussed above in relation to step 330, an inference is a link between a difference value and a probable cause. Inferences may be based on pre-determined mapping of probable causes to specific values, ranges of values, ratios, a closest match, conditional probabilities, etc. The determined probable causes may be passed to block 430 and block 450.

At block 430 the system generates optimizations. As discussed above in relation to step 335, optimizations may be any modification to system components, scheduling, or processes, including training for building professionals. Optimizations may be a simple reversal of a probable cause received from block 425, or may be a sophisticated analysis of multiple factors contributing to HVAC operations, such as wet bulb, dry bulb, and dew point temperatures, the building's thermal storage capacity, varying hourly utility costs, insulation, special events, system power draw, etc. Optimizations generated in block 430 may be sent to blocks 435 and 440.

In some embodiments, optimizations may identify one or more operating states available under a current HVAC operating mode. Operating states may be pre-determined control parameters configured to provide better performance, protect equipment, adjust to special circumstances, etc. For example, HVAC systems may be configured to operate in one of the following modes: Leaving Air Temperature (LAT), Manual, and Surge modes. In LAT mode the system attempts to match a received target temperature. In LAT mode the system may interface with a legacy HVAC control system to operate HVAC units. In Manual mode HVAC controls are set manually. For example, HVAC fluid flow or temperature may be set to a particular value. Surge mode may have multiple states configured for different situations and may implement multiple states simultaneously. These states may include Leaving Air Temperature Optimization, Softstart, Unstable Entering Water Temperature Control, Airflow Detection, Freeze Protection, Humidity Optimization, Pump Speed Optimization, Fan Energy Optimizer, Thermal Storage Optimization, Chiller Plant Efficiency Optimization, Boiler Efficiency Optimization, Heat Recovery Optimization.

In the Leaving Air Temperature Optimization state, a valve may control coil water flow to achieve a temperature of the air leaving the coil. A "setpoint" is the temperature at which the water control valve may be controlled to maintain the air leaving the coil. In the Leaving Air Temperature Optimization state, setpoints may be determined at partial and full load conditions, based on fan, pump, and reheat energy. Setpoints may be determined to promote efficiency and comfortable temperature.

When a coil is activated, and the deviation from a setpoint is significant, the tendency in some systems may be to open the valve more than necessary and overshoot the setpoint. In the Softstart state, flows are set to a specific flowrate for a period of time to minimize over-shoot and under-shoot situations.

Fluctuations in the temperature of the water supplied to a coil can cause unstable operation and loss of efficiencies by overheating and overcooling. In the Unstable Entering Water Temperature Control state, the system may monitor the entering water temperature and set the control valve to a predetermined setting until the fluctuation is stabilized, thereby avoiding unstable operation and inefficiencies.

When an HVAC system starts, a coil may see a temperature increase or decrease in the water temperature when air is moving over the coil. In the Airflow Detection state, the system monitors the entering and leaving water temperature to determine if there is airflow over the coil. If there is not airflow over the coil, the system sets the valve to a predetermined setting and monitors the coil until the airflow is corrected.

In the Freeze Protection state, the system may monitor outside air temperatures and leaving water temperature in a coil to determine when to set the control valve to a predetermined flow to prevent freezing. For example, the Freeze Protection state may be triggered if the outside air temperature or leaving fluid temperature is below a certain value, such as 40°. A continuous flow may then be sent through the coils to prevent freezing. If the leaving fluid temperature continues to be below the pre-defined temperature, the flow may be increased.

In the Humidity Optimization state, the system monitors the humidity of return air and adjusts the leaving air temperature setpoint to meet a predetermined return air humidity level. This may optimize the leaving air temperature while maintaining the proper humidity levels in a space.

In the Pump Speed Optimization state, the system may monitor pressure sensors coupled to the valves. The system may control pump speed to maintain a minimum differential pressure across various valves. The Pump Speed Optimization state may be configured to provide optimized pump speed across an entire HVAC system.

In the Fan Energy Optimizer state, the system may measure actual $BTUH/ft^2$ for each coil. The leaving air temperature setpoint may be set to provide a fan speed configured to satisfy airflow requirements in a space and configured to optimize $BTUH/ft^2$ for each space. The Fan Energy Optimizer state may set the leaving air temperature based on minimizing the energy used by the fans, which is energy that may be transferred to the airstream as additional heat.

Water or ice storage systems may be required to balance the time it takes to discharge their energy with the time it takes to recharge them during non-peak hours. In the Thermal Storage Optimization state, the system may monitor the capacity of the storage source and the forecasted need based on weather data and historical regression models to predict capacity requirements. This may maximize the benefits of thermal storage systems by integrating predictive and actual demand data into dispatch models.

In the Chiller Plant Efficiency Optimization state, production sequences may be optimized to provide peak efficiency at all load conditions. The Chiller Plant Efficiency Optimization state may use models based on actual and estimated performance to determine the optimal dispatch strategy for the cooling and heating equipment serving the demand, measured in real time via the pressure independent valves. Temperatures, flows, and equipment combinations may be determined based on actual data and measurements comparing various alternatives to achieve settings configured to optimize system efficiency.

In the Boiler Efficiency Optimization state, temperature and flow settings may be optimized to take advantage of condensing boiler technologies. In the Boiler Efficiency Optimization state the system monitors the $BTUH/ft^2$ requirements of spaces and associated flows to set supply temperatures to the coils configured to deliver optimized supply temperatures to the boilers. This state may use, inter alia, flows, production temperatures, air temperature, and outside conditions to determine settings for the various components.

Heat recovery systems may require a balance of the production and demand sides of the system to reach peak efficiency. In the Heat Recovery Optimization state, the system may monitor capacity and provide demand adjustments configured to match the optimal production capabilities of the heating and/or cooling heat recovery production equipment.

In blocks 420, 425, and 430, the system may be able to receive input (not shown) from various building professionals to adjust measurements, predictions, difference metrics, inferences, optimizations, etc. In this way the system can account for operator experience as well as provide a method of adjusting for unusual circumstances.

As discussed above in relation to step 345, at block 435 the system may generate optimization suggestions. Optimization suggestions may take various forms such as text, alert signals, images, web links, or sounds. Optimization suggestions may indicate equipment upgrades and replacements, changes to operation parameters, trainings, building adjustments, etc.

As discussed above in relation to step 350, at block 440 the system may generate control signals to automatically implement optimizations. In some implementations control signals may be accomplished by reducing optimizations from step 335 into a series of operations, and generating signals corresponding to HVAC interface control functions configured to perform the series of operations. In some implementations, control signals may instruct the HVAC system to enter a particular state of the current mode.

As discussed above in relation to step 355, at block 445 the system may generate differences from predicted output values. These may be sent as a part of reports, as raw data to be included in other metrics such as web presentations, or stored in local or third-party databases for further analysis.

As discussed above in relation to step 360, at block 450 the system may generate probable causes which may be sent as a part of reports, saved as raw data to be included in other metrics such as web presentations, or stored in local or third-party databases for further analysis.

As discussed above in relation to step 365, at block 455 the system generates differences from goal output values. Difference from goal output values may be paired with one or more causes for the difference, and may include suggestions for meeting the goal or indications of the source of the goal such as a promise by a particular vendor.

Figure 5A:
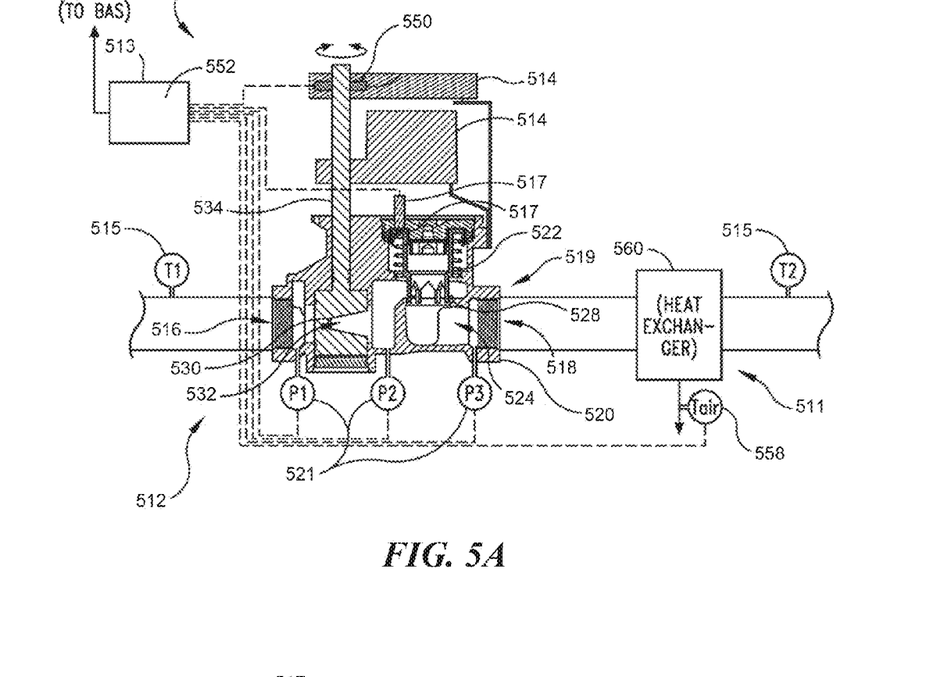
FIG. 5A is a schematic cross-sectional view of a pressure independent valve system configured to measure fluid flow rate.
Figure 5B:
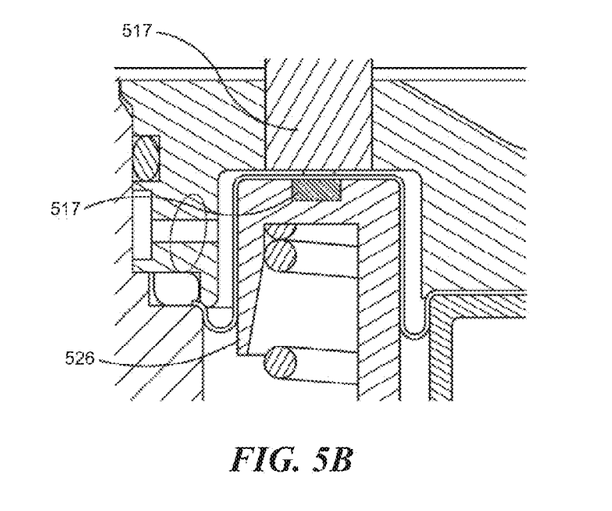
FIG. 5B is an enlarged cross-sectional view of a portion of the pressure independent valve of FIG. 5A.

FIGS. 5A and 5B are schematic cross-sectional views of a pressure independent valve system configured to measure fluid flow rate.

This pressure independent valve system has a flow control assembly 510 with a pressure compensated flow rate controller 512. In some embodiments, the pressure independent valve system has a BTU meter 514. In the illustrated embodiment, the pressure compensated flow rate controller 512 is operatively connected to a controller 513 configured to monitor temperature sensors 515 before and after a heating or cooling device or load in a heating and chilled water system 511. The controller 513 can also monitor pressure sensors P1, P2 and P3—collectively, 521—in addition to valve stem position and an optional air temperature sensor. The position of an internal rate control piston 526 can also be monitored by a proximity sensor 517 that, in turn, is monitored by the controller 513.

The pressure compensated flow rate controller 512 includes a pressure independent flow control valve 519 that provides constant flow rate at the same stem set point even with large fluctuations in the pressure drop across the valve. Provided that a minimum pressure drop is applied to the valve 519, the flow rate through the valve is very predictable for each stem set point. This rate control technology and a pressure independent flow rate controller are described in detail in U.S. Pat. No. 7,128,086 and U.S. Patent Application Publication No. 2012-0185102.

In some embodiments, controller 513 monitors the stem position and P1 and P3 pressure sensors 521 to infer the flow rate. This flow rate may then be multiplied by the difference in temperature across the heating or cooling load (e.g. a coil) to determine the BTU rate being transferred.

The assembly 510 illustrated in FIGS. 5A and 5B has the flow control valve 519 integrally connected to BTU meter 514. The flow control valve 519 is a high-performance pressure-independent constant flow configured to maintain a constant flow rate across the valve independent of the fluid pressure differentials or fluctuations between the inlet 516 and the outlet 518 of the valve. In one embodiment, the pressure independent flow control valve 519 is a DeltaP Valve®, manufactured and sold by Flow Control Industries, Inc., of Woodinville, Wash. Other embodiments can use other pressure independent flow control valves that provide sufficient accuracy and performance.

The valve 519 includes a housing 520 that defines the inlet 516 and the outlet 518 and that contains the internal components 522 of the valve, such as an internal passageway 524 connected to the inlet 516 and outlet 518, a spring biased piston 526 movably disposed adjacent to a piston seat 528 through which the water or other fluid can flow as the water moves through the flow passageway 524. The valve 519 includes a flow throttle 530 rotatably disposed in a cavity within the flow passageway 524. The flow throttle 530 has an opening 532 configured to selectively permit fluid to flow from the inlet 516, past the piston 526 and piston seat 528 (when the valve is not closed), to the outlet. The flow throttle 530 is connected to a valve stem 534 that is rotatably adjustable so as to rotate the flow throttle 530 within the flow passageway 524. Accordingly, the flow rate through the valve 519 can be very accurately adjusted by rotating the valve stem 534, thereby rotating and adjusting the flow throttle 530.

The valve 19 of the illustrated embodiment provides a constant flow rate through the valve independent of pressure drops across the valve and has the turn down of approximately 100:1 or more, thereby allowing very accurate control of the fluid flow through the entire pressure independent range.

In embodiments with a BTU meter, the BTU meter 514 may have a position sensor 550 connected to the fitting 548 and calibrated to accurately and precisely detect the angular position of the fitting 548 and the stem 534 of the valve. The position sensor 550 is coupled to a controller 552 that receives data about the rotational position of the fitting 548 and/or the stem 534. As indicated above, the valve 519 is a high performance pressure independent valve with a high turn down, which provides for very accurate control of the water flow rate through the valve. Once the stem 534 and throttle 530 have been rotated to a selected position, the flow rate through the valve remains constant independent of pressure fluctuations. This highly accurate control of the fluid flow rate is such that the valve 519 can be calibrated to very accurately identify or determine the fluid flow rate through the valve based on the position of the stem 534 (e.g., the angular position of the stem), and thus the throttle 530. The position sensor 550 is also calibrated to accurately detect the position of the stem relative to a predetermined reference point. Accordingly, the controller 552 uses the data from the position sensor about the position of the stem 534 to very accurately determine the actual flow rate of water through the valve 519.

In the illustrated embodiment, the controller 552 of the BTU meter 514 is coupled to temperature sensors 515 positioned at selected locations in a heating and cooling system 511, shown schematically. The controller 552 receives data from the temperature sensors 515, such as one temperature sensor for supply water and another for the return water of a heat exchanger. The controller 552 is configured to calculate the energy consumption based on the flow rate data and the temperature sensor data. The result is a very accurate measurement of energy consumption in real time by the BTU meter 514.

In at least one embodiment, the assembly includes an air temperature sensor 558 and air flow sensor 560 shown in FIG. 5. The air temperature sensor 558 and air flow sensor 560 can also be monitored by the controller 513 discussed above. In conjunction with fan on/off indication this sensor can be used to monitor cooling or heating coil performance. The air temperature sensors can also be used to control the stem position and to vary the flow fluid through the cooling or heating coil to maintain a desired air temperature.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system for HVAC analysis comprising:
   a transceiver configured to receive a setting of a pressure independent valve, wherein the setting of the pressure independent valve corresponds to a flow rate through the pressure independent valve;
   a pre-processor configured to:
   compute, based on the setting of a pressure independent valve, the flow rate through the pressure independent valve, wherein computing the flow rate is independent of pressure measurements; and
   compute one or more HVAC actual energy density values,
   wherein at least one HVAC actual energy density value is based on the computed fluid flow rate through the pressure independent valve;
   a measurement predictor configured to predict one or more expected HVAC values, wherein the one or more expected HVAC values are at least partially dependent on an expected operation of the pressure independent valve;
   a comparator configured to compare the one or more of the HVAC actual energy density values with one or more of the expected HVAC values such that a different value is determined;

an inference component configured to determine a probable cause based on a match between the difference value and one or more known difference values; and
an optimization component configured to determine one or more changes to a building component or process based on the difference value or probable cause;
wherein the transceiver is further configured to send one or more signals based on the determined one or more changes.

2. The system of claim 1, wherein at least one of the one or more known difference values is based on previously observed reactions to a number of stimuli of HVAC systems comprising one or more pressure independent valves.

3. The system of claim 1, wherein the one or more changes are integrated into controlling the pressure independent valve.

4. The system of claim 3, wherein the one or more changes are integrated into controlling the pressure independent valve by causing a valve stem rotation of the pressure independent valve.

5. The system of claim 1, wherein at least one of the one or more signals is a control signal for one or more HVAC systems to automatically implement the one or more changes.

6. The system of claim 1, wherein at least one of the one or more signals is a message to indicate the one or more changes to a user.

7. The system of claim 1, wherein the optimization component is configured to determine the one or more changes to a building component or process based on the difference value and the probable cause.

8. The system of claim 1, wherein the one or more changes comprise a change: to minimize power consumption, to maximize unit life, based on a cost benefit analysis, to component engagement sequences, to indicating an improvement for system capacity, or a building professional training suggestion.

9. The system of claim 1, wherein the signal is configured to instruct an HVAC system to enter a selected operational mode.

10. The system of claim 9, wherein the selected operational mode is a Leaving Air Temperature mode in which the system interfaces with an HVAC control system that provide HVAC settings to match a received target temperature.

11. The system of claim 9, wherein the selected operational mode has one or more states corresponding to one or more current situations of the HVAC system.

12. The system of claim 11, wherein the one or more states comprises a Leaving Air Temperature Optimization state in which the setting of the pressure independent valve is controlled to achieve a temperature of material leaving a coil based, at least in part, on one or more determined fan, pump, or reheat energy conditions.

13. The system of claim 11, wherein the one or more states comprises a Softstart state in which the setting of the pressure independent valve is controlled to achieve a specific flow rate for a set period of time before updating the flow rate to achieve a desired HVAC measurement.

14. The system of claim 11, wherein the one or more states comprises a Unstable Entering Water Temperature Control state in which the system monitors an entering water temperature and changes the setting of the pressure independent valve to a predetermined setting until a fluctuation in the entering water temperature is stabilized.

15. The system of claim 11, wherein the one or more states comprises a Boiler Efficiency Optimization state in which the system sets supply temperatures to one or more coils based on the flow rate through the pressure independent valve, a measured air temperature, and determined conditions outside a building.

16. A method for HVAC analysis comprising:
identifying a setting of a pressure independent valve, wherein the setting of the pressure independent valve corresponds to a flow rate through the pressure independent valve;
computing, based on the setting of a pressure independent valve, the flow rate through the pressure independent valve, wherein computing the flow rate is independent of pressure measurements;
computing one or more HVAC actual values, wherein at least one HVAC actual value is based on the computed fluid flow rate through the pressure independent valve;
predicting one or more expected HVAC values, wherein the one or more expected HVAC values are at least partially dependent on an expected operation of the pressure independent valve;
comparing the one or more of the HVAC actual values with one or more of the expected HVAC values such that a difference value is determined;
determining a probable cause for the difference value based on a match between the difference value and one or more known difference values;
determining one or more changes to a building component or process based on the difference value or probable cause; and
sending one or more signals based on the determined one or more changes.

17. The method of claim 16, wherein the one or more changes are integrated into controlling the pressure independent valve by causing a rotation of a valve stem of the pressure independent valve.

18. A computer-readable storage medium storing instructions that, when executed by a computing system, cause the computing system to perform operations for HVAC analysis, the operations comprising:
identifying a setting of a pressure independent valve, wherein the setting of the pressure independent valve indicates a flow rate through the pressure independent valve;
computing, based on the setting of a pressure independent valve, the flow rate through the pressure independent valve, wherein computing the flow rate is independent of pressure measurements;
computing one or more HVAC actual values, wherein at least one HVAC actual value comprises a value based on the computed fluid flow rate through the pressure independent valve;
predicting one or more expected HVAC values, wherein the one or more expected HVAC values are at least partially dependent on an expected operation of the pressure independent valve;
comparing the one or more of the HVAC actual values with one or more of the expected HVAC values such that a difference value is determined;
determining a probable cause for the difference value based on a match between the difference value and one or more known difference values;
determining one or more changes to a building component or process based on the difference value or probable cause; and
sending one or more signals based on the determined one or more changes.

19. The computer-readable storage medium of claim 18, wherein the signal is configured to instruct an HVAC system to enter a selected operational mode in which the setting of the pressure independent valve is controlled to achieve a specific flowrate for a set period of time before updating the flowrate to achieve a desired HVAC measurement.

* * * * *